United States Patent [19]
Beall et al.

[11] Patent Number: 5,219,799
[45] Date of Patent: Jun. 15, 1993

[54] LITHIUM DISILICATE-CONTAINING GLASS-CERAMICS SOME OF WHICH ARE SELF-GLAZING

[75] Inventors: George H. Beall, Big Flats; Lina M. Echeverria; Joseph W. Morrissey, both of Corning; Joseph E. Pierson, Painted Post, all of N.Y.

[73] Assignee: Corning Incorporated, Corning, N.Y.

[21] Appl. No.: 772,217

[22] Filed: Oct. 7, 1991

[51] Int. Cl.$^5$ ............................................. C03C 10/04
[52] U.S. Cl. ........................................... 501/5; 501/7; 501/63; 501/68; 501/69; 501/70; 501/71
[58] Field of Search .................... 501/5, 7, 63, 68, 69, 501/70, 71, 72

[56] References Cited

U.S. PATENT DOCUMENTS

| | | | |
|---|---|---|---|
| 3,006,775 | 10/1961 | Chen | 501/5 X |
| 3,231,456 | 1/1966 | McMillan et al. | 501/5 X |
| 3,236,610 | 2/1966 | McMillan et al. | 65/33 |
| 3,238,085 | 3/1966 | Hayami et al. | 501/5 X |
| 3,460,987 | 8/1969 | McMillan et al. | 501/73 X |
| 3,804,608 | 4/1974 | Gaskell et al. | 65/33 |
| 3,977,857 | 8/1976 | Mattox | 501/5 X |
| 4,414,282 | 11/1983 | McCollister et al. | 501/5 X |
| 4,480,044 | 10/1984 | McAlinn | 501/5 X |
| 4,672,152 | 6/1987 | Shinohara et al. | 501/69 X |

FOREIGN PATENT DOCUMENTS 924996  5/1963  United Kingdom .
943599  12/1963  United Kingdom .

*Primary Examiner*—Karl Group
*Attorney, Agent, or Firm*—C. S. Janes, Jr.

[57] ABSTRACT

This invention relates to glass-ceramic articles containing lithium disilicate crystals as the predominant crystal phase and consisting essentially, in weight percent, of 8-19% $Li_2O$, 0-5% $Na_2O$, 0-7% $K_2O$, 0-8% $Na_2O+K_2O$, 0-10% CaO, 0-6% SrO, 0-6% BaO, 2-12% $Na_2O+K_2O+CaO+SrO+BaO$, 0-7% ZnO, 0-11% $Al_2O_3$, 1.5-11% $ZnO+Al_2O_3$, with a molar ratio $(Na_2O+K_2O)/(ZnO+Al_2O_3)$ between 0.075-1.25, 65-80% $SiO_2$, and as a nucleating agent 1.5-7% $P_2O_5$ and/or 0.0001-0.1% Pd. Glass-ceramics having certain compositions within those ranges are self-glazing.

7 Claims, No Drawings

LITHIUM DISILICATE-CONTAINING GLASS-CERAMICS SOME OF WHICH ARE SELF-GLAZING

RELATED APPLICATION

U.S. application Ser. No. 07/772,216, now U.S. Pat. No. 5,176,961, filed concurrently herewith by D. H. Crooker and L. M. Echeverria under the title COLORED, TEXTURED GLASS-CERAMIC ARTICLES describes the production of glass-ceramic articles exhibiting a variegated color, surface appearance. That application is particularly directed to the formation of large sheets of glass-ceramics wherein lithium disilicate crystals comprise the predominant crystal phase.

BACKGROUND OF THE INVENTION

Glasses having compositions approximating the stoichiometry of lithium disilicate ($Li_2O \cdot 2SiO_2$) require very high temperatures for melting and are notoriously unstable, i.e., they are very prone to devitrification, that latter characteristic to date having precluded the manufacture of glass-ceramic articles on a commercial scale therefrom due to the inadequacy of microstructural tailoring required for necessary property control. Thus, the fabrication of glass-ceramic articles containing lithium disilicate crystals as the predominant crystal phase (frequently utilizing $P_2O_5$ as a nucleating agent) has been reported in the art, such articles purportedly exhibiting high mechanical Because or rne inherent instability of the glass phase, however, the reproducibility in properties demanded in commercial production has been lacking. Nevertheless, on account of the high mechanical strengths demonstrated by glass-ceramic articles containing lithium disilicate crystals when those crystals are relatively uniformly fine-grained and homogeneously dispersed throughout the articles, research has continued to devise precursor glass compositions and heat treatment schedules therefor which would yield sound glass-ceramic articles wherein the advantageous physical properties of lithium disilicate-containing glass-ceramics would be reproducible.

Accordingly, the primary objective of the present invention was to devise glass compositions which would inherently be stable, thereby permitting a high degree of microstructural control during the development of crystals therein and imparting great flexibility in forming techniques, for example, drawing, floating, pressing, rolling, spinning, etc.

Another objective of the instant invention was to design glass compositions, which, upon being crystallized in situ via a heat treatment being applied thereto, would form glass-ceramic articles wherein the properties thereof are reproducible.

Yet another objective of the subject invention was to produce sound glass-ceramic articles which, during the crystallization heat treatment, develop a self-glazed surface of high gloss.

SUMMARY OF THE INVENTION

Inasmuch as it was recognized that the fundamental factor preventing the preparation of sound glass-ceramic bodies containing lithium disilicate as the predominant crystal phase was the instability of the glass phase, studies were un to find glass-forming ingredients which, when incorporated into the base glass composition approximating the stoichiometry of $Li_2O \cdot 2SiO_2$, would yield stable residual glasses in the glass-ceramic articles produced through heat treatment thereof. Those studies led to operable base precursor compositions consisting essentially, expressed in terms of weight percent on the oxide basis, of 8–19% $Li_2O$, 0–5% $Na_2O$, 0–7% $K_2O$, 0–8% $Na_2O+K_2O$, 0–10% CaO, 0–6% SrO, 0–6% BaO, 2–12% $Na_2O+K_2O+CaO+SrO+BaO$, 0–7% ZnO, 0–11% $Al_2O_3$, 1.5–11% $ZnO+Al_2O_3$, with a molar ratio $(Na_2O+K_2O+CaO+SrO+BaO):(ZnO+Al_2O_3)$ between 0.075–1.25, 65–80% $SiO_2$, and as a nucleating agent 1.5–7% $P_2O_5$ and/or 0.0001–0.1% Pd. The preferred compositions contain at least 2% ZnO and/or 2% $K_2O$ or 1% CaO and/or 3% $Al_2O_3$.

In our laboratory investigations to locate desirable glass-forming ingredients for incorporation into the base $Li_2O \cdot 2SiO_2$ composition which would improve parent glass stability and yield highly durable glasses in the resulting glass-ceramic products, certain stoichiometric compositions conveniently referred to in terms of natural mineral analogs were added as described below. Those additions were found to be not only capable of providing glass-ceramic articles exhibiting high mechanical strength and toughness values, those values being reproducible, but also to improve the melting behavior thereof.

Chkalovite Glasses

Stable glass-ceramic articles were prepared through additions of about 10–20% by weight of glasses having compositions based on the mineral chkalovite ($Na_2O \cdot ZnO \cdot 2SiO_2$). The base composition was extended to include $R_2O \cdot ZnO \cdot xSiO_2$, where R was Na and/or K, and x ranged up to 10. Sound glass-ceramic bodies were produced from all compositions. Whereas the major proportion of the chkalovite component remains in the residual glass of the final glass-ceramic, any excess silica resulting from the additions is precipitated as crystals in the form of cristobalite or $\alpha$-quartz.

Potassium Feldspar Glasses

About 10–20% by weight of glasses having compositions based on potassium feldspar ($K_2O \cdot Al_2O_3 \cdot 6SiO_2$) were incorporated into the base $Li_2O \cdot 2SiO_2$ glass composition. Again, sound glass-ceramic bodies were produced from all compositions.

Anorthite Glasses

In like manner to the chkalovite and potassium feldspar glasses, about 10–50% by weight of glasses having compositions based on the anorthite stoichiometry ($CaO \cdot Al_2O_3 \cdot SiO_2$) were included in the base $Li_2O \cdot 2SiO_2$ glasses. Yet again, sound glass-ceramic articles were prepared from all compositions.

Glass-ceramics have been marketed as articles of tableware for a number of years by Corning Incorporated, Corning, N. Y. under such trademarks as CENTURA, PYROCERAM, and SUPREMA. The predominant crystal phase in the CENTURA ware is a combination of nepheline and celsian and/or hexacelsian. Hexacelsian comprises the predominant crystal phase in the PYROCERAM tableware, and potassium fluorrichterite constitutes the predominant crystal phase in the SUPREMA tableware with a minor amount of cristobalite. Each of those products requires a glaze having a lower coefficient of thermal expansion than the glass-ceramic body to which it is to be applied in order to provide a decorative high surface gloss and to enhance the mechanical strength of the glass-ceramic body.

Because of the inherent high mechanical strength and toughness exhibited by the present inventive glass-ceramics, articles of tableware can be fashioned therefrom having thinner wall thicknesses than those above-described commercial products. Such thin cross sections lead to products demonstrating translucencies approaching those of quality china, e.g., bone china.

We have further found that, by modifying the base compositions of the precursor glasses, glass-ceramic articles can be prepared which are self-glazing; i.e., as the precursor glass body is heat treated to cause the development of nuclei therein and the subsequent growth of crystals on those nuclei, a glassy layer is formed which diffuses to the surface. This self-glazing effect is controlled by the heat treatment schedule to which the glass body is subjected. It is especially dependent upon the length of the nucleation period. Hence, if surface nucleation is not completely depressed, crystals will be developed which protrude through the glassy layer, thereby giving rise to a dull surface. Accordingly, a long period of nucleation is demanded to assure the dominance of body nucleation and a minimum of surface nucleation. The utilization of higher levels of nucleating agent, however, can reduce the time necessary for nucleation. The rate of heating the nucleated glass to the crystallization temperature and the length of time to which the nucleated glass is exposed to the crystallization temperature can also affect the self-glazing phenomenon.

These self-glazing glass-ceramics can be deemed to comprise a mixture of lithium disilicate, a nucleating agent, and an accessory phase. The accessory phase is founded in the incorporation of glass compositions based upon the formulae $R_2O \cdot ZnO \cdot 2-10SiO_2$, where $R_2O$ is $Na_2O$ and/or $K_2O$, $K_2O \cdot Al_2O_3 \cdot 6SiO_2$ and/or $RO \cdot Al_2O_3 \cdot 2-6SiO_2$, where RO is selected from the group of CaO, SrO, and BaO. In like manner to the basic precursor glasses reported above, excess $SiO_2$ (customarily up to about 10% by weight) can be included. To assure obtaining the desired self-glazing phenomenon, the accessory glass component will be incorporated in an amount of at least 20% by weight, preferably at least 30% by weight. The glass-ceramic articles prepared with 30% by weight of the accessory component contain about 60% by weight lithium disilicate. Additions of the accessory glass component up to 50% by weight have been made, but the level of lithium disilicate crystals then drops to about 40% by weight, with consequent reduction in mechanical strength. Therefore, a 40% addition of an accessory glass component has been deemed a practical maximum.

The introduction of CaO in the accessory component in conjunction with $Al_2O_3$ results in the following two advantages: (1) it permits the use of spodumene, petalite, and/or amblygonite as batch materials for $Li_2O$, rather than the more expensive $Li_2CO_3$ (CaO can be present as an impurity in those minerals); and (2) it increases the overall extent of crystallinity in the final product, thereby allowing a reduction in the level of $Li_2O \cdot 2SiO_2$ crystals without seriously deteriorating the mechanical properties demonstrated by the glass-ceramic. Both factors lead to a net reduction in glass batch cost and frequently a faster melting rate of the batch.

Evidence of very high levels of crystallization (>75% by weight) with concomitant low levels of residual glass, is provided in x-ray diffractometry analyses which have indicated that the crystal assemblage of the $CaO/Al_2O_3$-containing glass-ceramics consists of lithium disilicate plus minor amounts of spodumene, cristobalite, and wollastonite. Based upon that evidence, it is believed apparent that most of the $CaO \cdot Al_2O_3 \cdot SiO_2$ accessory component goes into the crystal assemblage, instead of remaining within the residual glass.

Laboratory investigations have indicated that glass compositions particularly desirable for forming self-glazing glass-ceramic bodies will consist essentially, expressed in terms of weight percent on the oxide basis, of 2–10% total of 0–7% $K_2O$ and/or 0–8% CaO and/or 0–6% SrO and/or 0–6% BaO, 0–7% ZnO, 0–10% $Al_2O_3$, 1.5–10% $Al_2O_3 + ZnO$, with a molar ratio $(K_2O + CaO + SrO + BaO):(Al_2O_3 + ZnO)$ between 0.1–0.8, 9–18% $Li_2O$, and 65–77% $SiO_2$, with $P_2O_5$ being the preferred nucleating agent at levels of about 2–6%. The optional inclusion of $ZrO_2$ in amounts up to 3% can be useful in achieving higher levels of crystallization in the final product. Such crystallization reduces the translucency of the product, however.

In general, the operable nucleation temperatures will vary between about 475°–700° C. and crystallization will take place over the 750°–1000° C. temperature interval. As can be appreciated, the periods of time required for essentially complete nucleation and crystallization are related to the thickness dimension of the product. Hence, thin-walled articles will require shorter periods of time for each heat treating step than articles of thicker cross section.

To assure the most preferred self-glazing, the precursor glass articles containing the accessory components will be exposed to temperatures between about 475°–625° C. for an extended period of time to achieve a high degree of nucleation. For articles having a configuration suitable for tableware, that period of exposure will be in excess of one hour, preferably in the vicinity of three hours. Laboratory experience has demonstrated that a slow increase in temperature over the nucleation interval, rather than a dwell period at a specific temperature within that interval, frequently results in more complete nucleation. Thereafter, the temperature of the nucleated glass article is raised relatively quickly to within the crystallization range and the article is retained therewithin for about 1–4 hours to secure essentially complete crystallization.

Two factors other than gloss and translucency must be addressed in the manufacturing process for producing tableware; viz., the relative fluidity of the precursor glass during the heat treating step and the level of internal stress exerted on the ware during crystallization thereof. Relative fluidity provides a measure of thermal deformation exhibited by the glass article during the heat treatment process. The occurrence of high internal stresses during crystallization is of particular significance in glasses with low relative fluidity, inasmuch as they may crack or mechanically deform the ware. The sharpness and height of the exothermic peak observed via differential thermal analysis (DTA) can provide a measure of the stresses exerted over the ware during crystallization. Thus, where the exothermic peak is relatively short and broad, the nucleation/crystallization density change in the glass is less rapid and, hence, there is less stress buildup.

Where the articles will be crystallized in contact with formers, the precursor glass must be so designed that it will sag somewhat during the heat treatment thereof such that it can be made to conform to the configuration of the former. Thus, the relative fluidity of the glass over the nucleation and crystallization temperature intervals must be adequate to permit such forming.

In summary, careful control of the viscosity level of the glass during the crystallization process yields the most advantageous product. Thus, the most preferred products result when the viscosity level of the glass is held between about $1 \times 10^{10} - 5 \times 10^{11}$ poises and the heat up rate is regulated to assure that those values are maintained.

Glass-ceramic articles containing $Li_2O \cdot 2SiO_2$ as the predominant crystal phase are white in color. However, the addition in amounts of about 0.01-7% by weight total of such colorants as $CeO_2$, CdS and cadmium sulfoselenide and the transition metal oxides, e.g., $Co_3O_4$, NiO, $Fe_2O_3$, $MnO_2$, CuO, $Cr_2O_3$, and $V_2O_5$, to the precursor glass compositions in order to impart color is well known in the glass-ceramic art. The high strength and toughness values displayed by the inventive materials permit their use as tableware in thinner cross section than conventional ceramic materials employed for that application. The glossy surface and body translucence impart a very attractive appearance to the inventive materials. Moreover, the intensity of surface gloss can be controlled through control of the top heat treatment (crystallization) temperature. Translucency is a key aesthetic property inasmuch as it adds depth and, hence, a third dimension to tableware materials.

Prior Art

British Patent No. 924,996 (McMillan et al.) describes the formation of glass-ceramic articles via the phosphate nucleation of precursor glass compositions within the following ranges in weight percent:

| | | | |
|---|---|---|---|
| $Li_2O$ | 0-27 | SrO and/or BaO and/or PbO | 0-5 |
| MgO | 0-32 | $Na_2O$ and/or $K_2O$ | 0-5 |
| $Al_2O_3$ | 0-36 | ZnO | 0-10 |
| $SiO_2$ | 45-88 | CaO | 0-10 |
| $P_2O_5$ | 0.5-6 | $B_2O_3$ | 0-10 |

Because of those extremely broad composition intervals, x-ray diffractometry identified the presence of a large variety of crystal phases including β-spodumene, β-spodumene-β-quartz solid solution, β-eucryptite, α-quartz, α-cristobalite, clinoenstatite, forsterite, cordierite, $Li_2O \cdot SiO_2$, and $Li_2O \cdot 2SiO_2$. Whereas overlap quite apparently exists between the ranges of the patent and those of the present inventive products, none of the working examples provided in the patent had a composition coming within the intervals prescribed in the subject invention.

British Patent No. 943,599 (McMillan et al.) discloses the production of glass-ceramic articles via the phosphate nucleation of precursor glass compositions within the following regimes in weight percent:

| | | | |
|---|---|---|---|
| $Li_2O$ | 2-27 | $Na_2O$ and/or $K_2O$ | 0-5 |
| ZnO | 10-59 | MgO | 0-10 |
| $SiO_2$ | 34-81 | CaO and/or BaO | 0-5 |
| $P_2O_5$ | 0.5-6 | $B_2O_3$ | 0-10 |

| | | | |
|---|---|---|---|
| $Al_2O_3$ | 0-10 | PbO | 0-5 |

X-ray diffractometry identified the presence of a variety of crystal phases including α-cristobalite, $2ZnO \cdot SiO_2$, and $Li_2O \cdot 2SiO_2$. Although there is partial overlap between those ranges and the composition regions of the instant invention, the levels of ZnO are higher than are prescribed in the present inventive precursor glasses.

U.S. Pat. No. 3,006,775 (Chen) refers to glass-ceramic articles containing crystals of lithium aluminum silicate and/or lithium silicate which are prepared from glass compositions consisting essentially, in weight percent, of:

| | | | |
|---|---|---|---|
| $Li_2O$ | 4-30 | $SiO_2$ | 50-80 |
| $Al_2O_3$ | 3-25 | Fluxing Agents | 0-15* |

*One or more of $Na_2O$, $K_2O$, $B_2O_3$, $CaF_2$, $ZrO_2$, CaO, ZnO, MgO, NaF, KF, BaO.

Again, there is some overlap between those ranges and those of the subject invention disclosure. Nevertheless, $Li_2 \cdot 2SiO_2$ crystallization is nowhere mentioned and none of the working examples set out in the patent had a composition coming within the composition intervals of the instant invention.

U.S. Pat. No. 3,231,456 (McMillan et al.) discusses two different composition areas which are phosphate nucleated to form glass-ceramic articles having an integral surface film of metallic copper. The two base glass compositions are tabulated below in weight percent:

| Compositions A | | | |
|---|---|---|---|
| $Li_2O$ | 0.1-27 | $P_2O_5$ | 0.5-6 |
| MgO | 0.1-32 | $Na_2O$ and/or $K_2O$ | 0-5 |
| $Al_2O_3$ | 0.1-36 | ZnO | 0-10 |
| $SiO_2$ | 45-88 | $B_2O_3$ | 0-10 |
| SnO | 0.1-2 | CaO and/or BaO | 0-5 |

| Compositions B | | | |
|---|---|---|---|
| $Li_2O$ | 2-27 | $Na_2O$ and/or $K_2O$ | 0-5 |
| ZnO | 5-59 | $Al_2O_3$ | 0-10 |
| $SnO_2$ | 0.1-2 | MgO | 0-10 |
| CuO | 0.5-7.5 | CaO and/or BaO | 0-5 |
| $P_2O_5$ | 0.5-6 | $SiO_2$ | 34-81 |

As can be observed, except for the mandated inclusion of SnO in Compositions A and CuO in Compositions B, some overlap exists between those composition intervals and those required in the present inventive precursor glasses. Nevertheless, even ignoring the presence of CuO and SnO, none of the working examples supplied in the patent had a composition encompassed within the ranges of the subject inventive glasses.

U.S. Pat. No. 3,236,610 (McMillan et al.) reports the fabrication of bonded metal-ceramic laminates wherein a glass-ceramic body comprises the ceramic portion. The glass-ceramic consists essentially, in weight percent, of:

| | | | | | | |
|---|---|---|---|---|---|---|
| $SiO_2$ | 50-80 | $Li_2O$ | 5-15 | PbO | 0-30 | (preferably 0.5-30) |
| $Al_2O_3$ | 0-3 | $B_2O_3$ | 0-7 | $P_2O_5$ | 1-3 | |

| ZnO | 5-30 | K₂O | 0-5 | Na₂O | 0-5 |

Whereas there is some overlap between those ranges and those of the inventive precursor glasses, there is no discussion of the crystal phases generated and the three working examples furnished had compositions outside of the instant inventive glasses.

U.S. Pat. No. 3,238,085 (Hayami et al.) records the preparation of glass-ceramic articles having compositions within a basic $Li_2O$–$SiO_2$ system which are nucleated with 2–8% $As_2O_3$, and $MoO_3$ and/or $WO_3$ as optional supplemental nucleating agents. The patentees referred to the possible addition of at least one member of the group $Al_2O_3$, $B_2O_3$, CaO, CdO, $CeO_2$, $Sb_2O_3$, and ZnO. $P_2O_5$ is nowhere mentioned in the patent.

U.S. Pat. No. 3,460,987 (McMillan et al.) describes the formation of glass-ceramic coatings for various substrates, particularly as coatings for carbon blocks. Two composition areas having relevance to the present inventive precursor glasses are tabulated below in weight percent:

| SiO₂ | 60-75 | Na₂O | 0-5 | BaO | 0-5 |
|---|---|---|---|---|---|
| Li₂O | 8-12 | K₂O | 0-5 | CaO | 0-10 |
| Al₂O₃ | 8-12 | ZnO | 0-5 | B₂O₃ | 0-10 |
| P₂O₅ | 0.5-6 | SrO | 0-5 | | |
| SiO₂ | 60-75 | K₂O | 0-5 | BaO | 0-5 |
| Li₂O | 10-15 | ZnO | 0-5 | CaO | 0-10 |
| Al₂O₃ | 6-10 | SrO | 0-5 | B₂O₃ | 0-10 |
| P₂O₅ | 0.5-6 | Na₂O | 0-5 | MgO | 10-14 |

No identification of the crystal phases developed in either composition regime is supplied and the $Al_2O_3$ concentrations are generally greater than are utilized in the present inventive precursor glasses.

U.S. Pat. No. 3,804,608 (Gaskell et al.) discloses a method for making glass-ceramic articles from precursor glasses selected from various base composition systems, two of which are relevant to the glasses of the present invention. Those systems are recited below in weight percent:

| SiO₂ | 75-90 | Li₂O | 7-13 |
|---|---|---|---|
| Al₂O₃ | 1-9 | P₂O₅ and/or ZrO₂ and/or TiO₂ | 2.5-4.5 |
| SiO₂ | 49-52 | TiO₂ | 0-12 |
| Al₂O₃ | 14-36 | F | 0-5 |
| Li₂O | 3-5 | P₂O₅ | 0-5 |
| ZrO₂ | 0-10 | ZrO₂ + TiO₂ + P₂O₅ + F | 3.5-15 |

Because the patent was directed to a method, the operability of that method with a wide variety of glass compositions was sought to be exhibited. Therefore, a wide variety of glass compositions was provided in the patent, thereby leading to some overlap with the composition intervals of the instant inventive glasses. None of the working examples supplied in the patent, however, had a composition satisfying all of the criteria mandated for the subject inventive precursor glasses.

U.S. Pat. No. 3,977,857 (Mattox) reports the fabrication of glass-ceramic articles consisting, in weight percent, of:

| SiO₂ | 60-80 | Al₂O₃ | 0-2 |
|---|---|---|---|
| Li₂O | 12-20 | Na₂O and/or K₂O | 1-7 |
| MgO | 2-14 | As₂O₃ | 0-1 |
| P₂O₅ | 1.5-6 | PbO | 0-5 |
| | | Co₃O₄ and/or MnO₂ and/or Fe₂O₃ and/or V₂O₅ and/or WO₃ | 0-2 |

Although there is some overlap between several ranges of the above components and those of the present inventive precursor glasses, the mandated presence of MgO differentiates the compositions of the products disclosed in the patent from those of the instant invention.

U.S. Pat. No. 4,414,282 (McCollister et al.) is concerned with the formation of glass-ceramic articles having compositions within the following regions, expressed in terms of weight percent:

| SiO₂ | 65-80 | K₂O | 1-8 |
|---|---|---|---|
| Li₂O | 8-16 | P₂O₅ | 1-5 |
| Al₂O₃ | 2-8 | B₂O₃ | 1.5-7 |

Whereas there is some overlap between the composition regions recited above and those of the subject inventive precursor glasses, the required inclusion of $B_2O_3$ separates the products of the patent from those of the present invention.

U.S. Pat. No. 4,672,152 (Shinohara et al.) discloses the preparation of glass-ceramic articles consisting essentially, in weight percent, of:

| SiO₂ | 60-90 | Alkali metal oxides other than Li₂O | 1-5 |
|---|---|---|---|
| Al₂O₃ | 1-10 | Alkaline earth metal oxide | 0-5 |
| Li₂O | 5-20 | F | 0-3 |
| B₂O₃ | 0-13 | | |

Although there is some overlap between the above composition ranges and those of the instant inventive precursor glasses, there is no mention of using $P_2O_5$ as a nucleating agent.

In summary, there is no discussion in the above prior art of stabilizing the properties of glass-ceramic bodies containing $Li_2O \cdot 2SiO_2$ as the predominant crystal phase through the addition to the precursor glass composition of a glass based upon the mineral chkalovite or a glass based upon potassium feldspar or a glass based upon anorthite. Furthermore, there is no description of the formation of glass-ceramic articles containing $Li_2O \cdot 2SiO_2$ as the predominant crystal phase which develop a self-glazed surface of high gloss.

DESCRIPTION OF PREFERRED EMBODIMENTS

Table I records a group of precursor glass compositions expressed in terms of parts by weight on the oxide basis demonstrating the parameters of the inventive compositions. Because the sum of the recited components totals or closely approximates 100, for all practical purposes the individual values reported in Table I may be deemed to represent weight percent. Examples 1–8 reflect operable base compositions and Examples 1–4 and 6–8 illustrate compositions capable of forming self-glazing glass-ceramic articles exhibiting high gloss. Examples 9 and 10 present glass compositions close to, but outside of, the ranges found to be necessary to yield the glass-ceramics of the instant invention. The actual batch ingredients may comprise any materials, either an oxide or other compound, which, when melted together with the other constituents, is converted into the desired oxide in the proper proportions. For example, Li₂CO₃ may constitute the source of Li₂O and AlPO₄ may comprise the source of both P₂O₅ and Al₂O₃.

The batch ingredients were compounded, thoroughly mixed together to assist in securing a homogeneous melt, and charged into platinum crucibles. The crucibles were moved into a furnace operating at about 1450° C. and the batches melted for about 16 hours. The melts were thereafter poured into steel molds to yield glass slabs having dimensions of about 5"×5"×0.5" (~12.7×12.7×1.3 cm), and those slabs were transferred immediately to an annealer operating at about 450° C.

It will be recognized that, whereas the above description is drawn to laboratory activity only, the glasses operable in the subject invention can be melted in large commercial melting units and formed into desired shapes via conventional glass melting and forming practice. It is only necessary that the compositions be fired at sufficiently high temperatures and for a sufficient length of time to produce a homogeneous melt, and thereafter the melt is cooled and simultaneously shaped into a glass body which customarily will then be annealed.

After the glass slabs were removed from the annealer, samples for testing purposes were cut from each, e.g., test bars for measuring modulus of rupture, and those test samples plus the remainder of the slabs subjected to the heat treatments reported in Table II, whereby the glasses were crystallized in situ to glass-ceramics. Table II also records the visual appearance of each glass-ceramic and values of various properties exhibited by the precursor glass and/or the resultant glass-ceramic, such as annealing point (A.P.) and strain point (S.P.), listed in terms of °C., density (Dens.), recorded in terms of g/cm³, linear coefficient of thermal expansion (Exp), reported in terms of $\times 10^{-7}$°C. modulus of rupture (MOR), cited in terms of Ksi, and toughness (Tough), expressed in terms of MPa√m, as determined in accordance with measurement techniques conventional in the art. Examples 9 and 10 cracked severely when subjected to the crystallization heat treatment.

TABLE I

|  | 1 | 2 | 3 | 4 | 5 |
|---|---|---|---|---|---|
| SiO₂ | 69.3 | 75.3 | 74.2 | 68.6 | 76.2 |
| Li₂O | 15.4 | 17.4 | 15.4 | 11.2 | 17.6 |
| K₂O | 6.05 | 2.2 | 3.25 | — | 2.23 |
| ZnO | 5.28 | 1.9 | — | — | 1.9 |
| MgO | — | — | — | — | 0.72 |
| CaO | — | — | — | 4.67 | — |
| Al₂O₃ | — | — | 3.54 | 8.56 | — |
| P₂O₅ | 3.84 | 2.9 | 3.37 | 4.18 | 2.94 |
| ZrO₂ | — | — | — | 2.4 | — |
|  | 6 | 7 | 8 | 9 | 10 |
| SiO₂ | 70.3 | 71.7 | 67.7 | 77.8 | 69.6 |
| Li₂O | 11.5 | 9.47 | 11.1 | 19.4 | 7.91 |
| CaO | 4.78 | 1.08 | 4.61 | — | 4.65 |
| Al₂O₃ | 8.77 | 9.49 | 8.45 | — | 10.1 |
| P₂O₅ | 4.28 | 5.48 | 5.43 | 2.43 | 4.92 |
| ZrO₂ | — | 2.49 | 2.37 | — | 2.37 |

TABLE II

| Example | Glass Properties | | | Heat Treatment | Visual Descr. | Glass-Ceramic Properties | | |
|---|---|---|---|---|---|---|---|---|
|  | A.P. | S.P. | Exp. |  |  | MOR | Exp. | Tough. |
| 1 | 431 | 401 | 112 | 300°/hr to 480° C. Hold for 1 hr 300°/hr to 800° C. Hold for 4 hrs | High gloss, white | 28.5 | 127 | 2.83 |
| 2 | 440 | 410 | 109 | 300°/hr to 480° C. Hold for 1 hr 300°/hr to 850° C. Hold for 2 hrs | High gloss, white | 33.9 | 101 | 3.0 |
| 3 | 452 | 423 | 100 | 300°/hr to 650° C. Hold for 4 hrs 300°/hr to 950° C. Hold for 4 hrs | High gloss, white | 31.4 | 78 | 3.3 |
| 4 | 495 | 462 | — | 200°/hr to 500° C. 10°/hr to 560° C. 300°/hr to 850° C. Hold for 2 hrs | High gloss, white | 22.1 | 50 | — |
| 5 | 414 | 443 | 109.2 | 300°/hr to 650° C. Hold for 4 hrs 300° C./hr to 850° C. Hold for 4 hrs | White | 29.0 | 98.5 | 2.79 |
| 6 | 442 | 476 | 81.5 | 300°/hr to 500° C. 10°/hr to 560° C. 300°/hr to 850° C. Hold for 2 hrs | High gloss, white | 20.0 | 49.2 | 1.98 |
| 7 | 503 | 541 | 66.8 | 300°/hr to 650° C. Hold for 2 hrs 300°/hr to 875° C. Hold for 4 hrs | High gloss, white | 17.8 | 76 | — |
| 8 | 568 | 501 | 80.2 | 300°/hr to 650° C. Hold for 2 hrs 300°/hr to 850° C. Hold for 4 hrs | High gloss, white | 22.0 | 47.2 | 1.62 |

We claim:

1. A glass-ceramic article containing Li₂O·2SiO₂ as the predominant crystal phase consisting essentially, expressed in terms of weight percent on the oxide basis, of 8–19% Li₂O, 0–5% Na₂O, 0–7% K₂O, 0–8% Na₂O+K₂O, 0–10% CaO, 0–6% SrO, 0–6% BaO, 2–12% Na₂O+K₂O+CaO+SrO+BaO, 0–7% ZnO, 0–11% Al₂O₃, 1.5–11% ZnO+Al₂O₃, with a molar ratio (Na₂O+K₂O+CaO+SrO+BaO):(Al₂O₃+ZnO) between 0.075–1.25, 65–80% SiO₂, and as a nucleating agent 1.5–7% P₂O₅ and/or 0.0001–0.1% Pd.

2. A glass-ceramic article according to claim 1 containing at least 2% ZnO and/or 2% $K_2O$.

3. A glass-ceramic article according to claim 1 containing at least 1% CaO and/or 3% $Al_2O_3$.

4. A glass-ceramic article according to claim 1 also containing 0.01-7% total of at least one member of the group consisting of CdS, cadmium sulfoselenide, $CeO_2$, $Co_3O_4$, $Cr_2O_3$, CuO, $Fe_2O_3$, $MnO_2$, NiO, and $V_2O_5$.

5. A self-glazed glass-ceramic article containing $Li_2O \cdot 2SiO_2$ as the predominant crystal phase consisting essentially, expressed in terms of weight percent on the oxide basis, of 9-18% $Li_2O$, 2-10% total of at least one member of the group consisting of 0-7% $K_2O$, 0-8% CaO, 0-6% SrO, and 0-6% BaO, 0-7% ZnO, 0-10% $Al_2O_3$, 1.5-10% $Al_2O_3$+ZnO, with a molar ratio ($K_2O$+CaO+SrO+BaO):($Al_2O_3$+ZnO) between 0.1-0.8, 65-77% $SiO_2$, and as a nucleating agent 2-6% $P_2O_5$.

6. A self-glazed glass-ceramic article according to claim 5 also containing up to 3% $ZrO_2$.

7. A self-glazed glass-ceramic article according to claim 5 also containing 0.01-7% total of at least one member of the group consisting of CdS, cadmium sulfoselenide, $CeO_2$, $Co_3O_4$, $Fe_2O_3$, CuO, $Cr_2O_3$, $MnO_2$, NiO, and $V_2O_5$.

* * * * *